(12) United States Patent
Wood

(10) Patent No.: US 6,781,781 B2
(45) Date of Patent: Aug. 24, 2004

(54) MAGNETIC READ HEAD HAVING DECODE CIRCUITRY

(75) Inventor: Stephen R. Wood, Huntington Beach, CA (US)

(73) Assignee: Axiohm Transaction Solutions, Inc., Ithaca, NY (US)

(*) Notice: Subject to any disclaimer, the term of this patent is extended or adjusted under 35 U.S.C. 154(b) by 0 days.

(21) Appl. No.: 09/841,220

(22) Filed: Dec. 2, 2002

(65) Prior Publication Data

US 2004/0012875 A1 Jan. 22, 2004

Related U.S. Application Data

(63) Continuation of application No. 09/260,856, filed on Mar. 1, 1999, now abandoned.

(51) Int. Cl.$^7$ .............................. G11B 5/02; G11B 5/48
(52) U.S. Cl. .................. 360/67; 360/234.4; 360/244.1; 360/137; 360/119; 360/123
(58) Field of Search ............................. 360/46, 67, 119, 360/125, 123, 129, 234.4, 244.1, 137

(56) References Cited

U.S. PATENT DOCUMENTS

| | | | | |
|---|---|---|---|---|
| 4,506,309 A | * | 3/1985 | Joannou et al. | 360/137 |
| 5,122,916 A | * | 6/1992 | Aranovsky | 360/124 |
| 5,276,572 A | | 1/1994 | Kinoshita et al. | 360/97.01 |
| 5,834,756 A | * | 11/1998 | Gutman et al. | 235/493 |

* cited by examiner

*Primary Examiner*—David Hudspeth
*Assistant Examiner*—Natalia Figueroa
(74) *Attorney, Agent, or Firm*—George R. McGuire; Bond, Schoeneck & King, PLLC

(57) ABSTRACT

The present invention features a magnetic read head having an IC component provided within or adjacent to the head case. No low-level, analog signals, which are generally highly susceptible to electrical noise, leave the head structure. Power and ground signals are provided to the hybrid head. Digitized data corresponding to encoded information upon the magnetic stripe on a credit card, ID badge, or similar article is provided at output terminals. Decoding is performed by an ASIC or similar device located at the read head. A data strobe signal and/or a magnetic medium detected signal may also be provided by the read head.

2 Claims, 6 Drawing Sheets

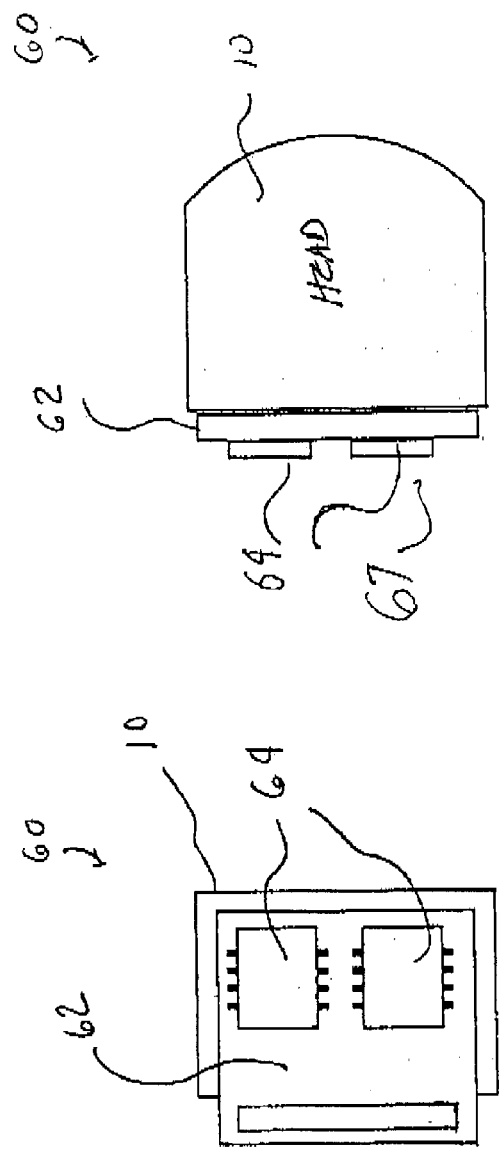
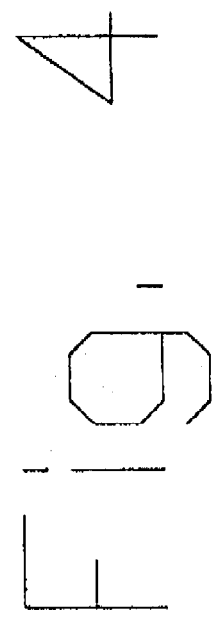

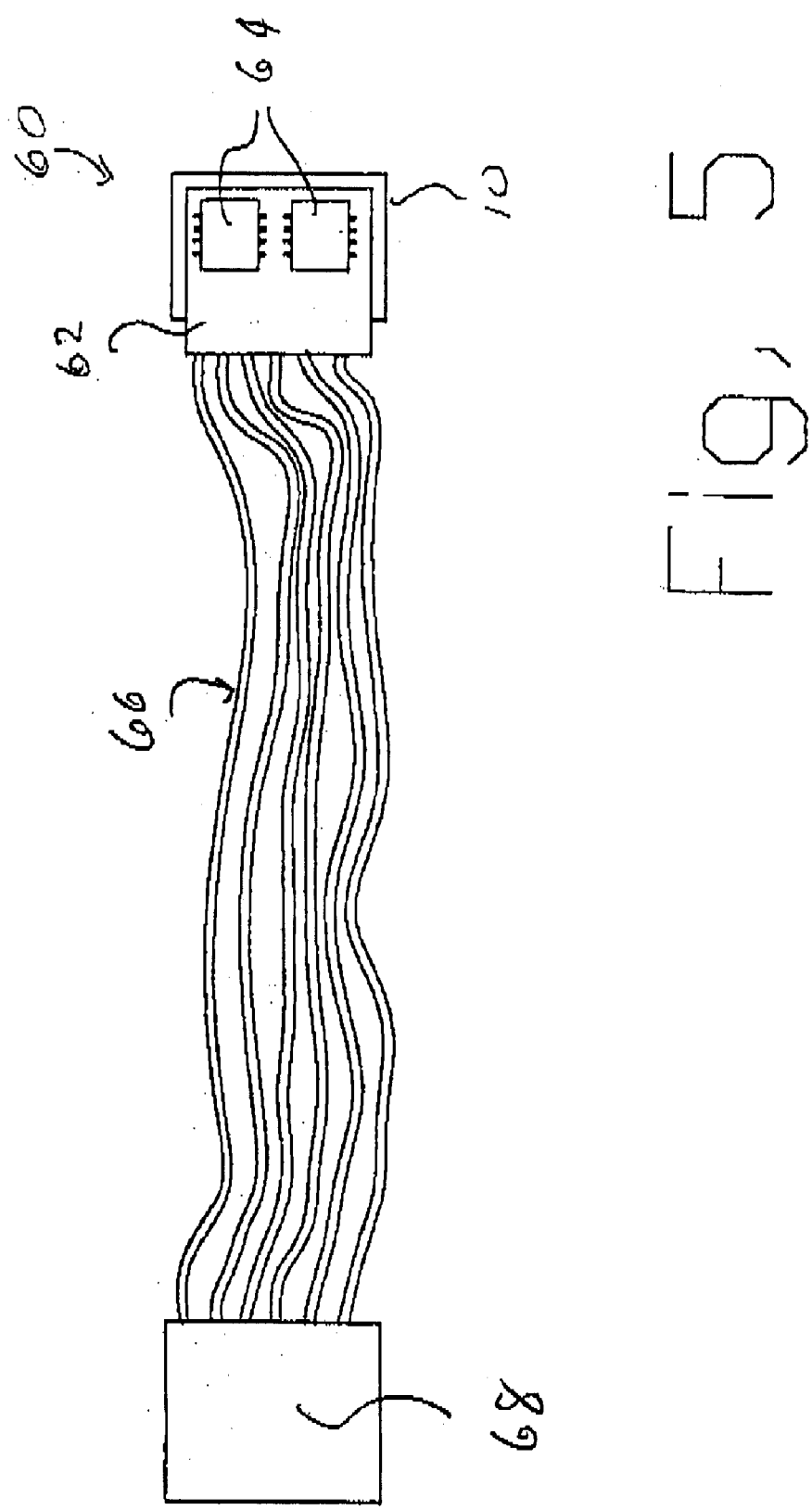

MAGNETIC READ HEAD HAVING DECODE CIRCUITRY

This application is a continuation of Ser. No. 09/260,856 filed on Mar. 1, 1999 now abandoned.

FIELD OF THE INVENTION

This invention pertains to magnetic read heads adapted to read information from a magnetic stripe and, more particularly, to a magnetic read heads adapted with a fully integrated circuit (IC) component, the IC component being a mixed signal (analog and digital) circuit produced on a single silicon chip and being capable of converting the magnetic head signal into a digital signal for direct use by computer components.

BACKGROUND OF THE INVENTION

Magnetic read heads have been used for many years for such diverse applications as playing back music and/or video signals from a magnetic medium, such as a tape or stripe, reading magnetic characters on the bottom of checks, and reading magnetically encoded information from magnetic stripes on credit cards, telephone calling cards, access badges, tickets, and the like. Generally, the heads of the prior art feature a magnetic pole piece having a precision gap at or near the point of contact with the media to be read. One or more coils of wire wound around the magnetic pole piece generate a voltage in response to a change in a magnetic field near the head gap. The electrical signal induced in the head is then amplified, filtered and eventually decoded to retrieve the information from the magnetic medium. Heretofore, magnetic read heads have generally been stand-alone structures. Only the pole piece, housing and winding have been packaged as a single device.

U.S. Pat. No. 3,612,835 for COMBINED OPTICAL AND MAGNETIC TRANSDUCER, issued Oct. 12, 1971 to Boley A. Andrews, et al., teaches a magnetic read head with an optical transducer installed within the head assembly. ANDREWS, however, teaches no electronic circuitry. Both the magnetic and the optical transducers generate small-amplitude analog signals which are unmodified within the head structure. In contradistinction, the magnetic head of the present invention includes decode electronics so that no analog, small-amplitude signals leave the head assembly. Rather a decoded, digital signal is presented at the output terminals of the read assembly, or an attached cable assembly.

U.S. Pat. No. 5,276,572 for MAGNETIC DISK APPARATUS, issued Jan. 4, 1994 to Kinoshita et al., teaches an electric circuit for controlling a magnetic head, the circuit being mounted on a flexible printed circuit, folded within an enclosure. Thus, integrated circuit components have been used on circuit boards, separate from the head assembly, as taught by KINOSHITA et al. The circuits were not mounted to the read head, but to a movable arm on springs with the flexible printed circuit used to interconnect the heads with pre-amplifier circuits mounted to the movable arm. Additional circuits were mounted in a, fixed location below the movable arm. A considerable distance is present between the head and any circuits.

U.S. Pat. No. 5,117,097 for KEY SYSTEM FOR A VEHICLE, issued May 26, 1992 to Takashi Kimura, et al., teaches a tuned resonant circuit packaged within a key structure. While not a magnetic read head, the KIMURA structure does include a pole piece (i.e., the protruding extension of the key structure) having a winding thereupon. Discreet inductive and capacitive elements are connected to the winding to form a resonant circuit. The inventive read head, on the other hand, encompasses a structure to read information from a magnetic stripe or the like and, using self-contained circuitry, to provide a digital output signal corresponding to the information on the magnetic stripe. The inventive head does not rely on a resonant circuit comprising inductive and/or capacitive elements connected to the read head winding.

U.S. Pat. No. 5,212,602 for MAGNETIC HEAD HAVING A FUSE WITHIN HEAD CASE, issued May 18, 1998 to Hidefumi Suzuki teaches a magnetic head with a fuse physically within the head structure. The fuse is connected in series with the read head and is used to permanently disable the read head at end-of-life to prevent fraudulent use of the head (e.g., forging credit cards). The inventive read head, however, contains no fuse or similar structure designed to disable the head. Rather, the inventive head features an on-board decode electronics package designed to convert low-level, analog signals read from a magnetic stripe into a digital output signal.

Finally, U.S. Pat. No. 5,450,263 for THIN FILM INDUCTORS, INDUCTOR NETWORK AND INTEGRATION WITH OTHER PASSIVE AND ACTIVE DEVICES, issued Sep. 12, 1995 to Chan M. Desaigoudar, et al. teaches a fabrication technique for forming thin-film inductors, capacitors, resistors and semiconductors on a thin substrate. These components, used in combination, are capable of constructing a multi-channel, magneto-resistive or similar type read head. The magnetic read head of the instant invention, however, is totally different. A physical coil of wire wound upon a pole piece, not a thin-film inductor, is used as a traditional inductive pickup. Additional circuitry within or near the head casing is used not as a part of the pickup portion of the head, but rather as an IC component to convert a low-level, analog signal induced in the read head winding into a digital output signal.

It is therefore an object of the invention to provide a read head for reading encoded information from a magnetic stripe or similar magnetic medium.

It is a further object of the invention to provide a read head having IC components packaged within the head casing or packaged as a monolithic part of the head, forming a unitary structure.

It is an additional object of the invention to provide a read head adapted to receive power, ground and control signals and to provide a digital output signal at a standard, predetermined signal level.

It is a still further object of the invention to provide a read head which provides a magnetic media detected signal.

It is yet another object of the invention to provide a read head with a low susceptibility to external electrical noise.

It is another object of the invention to provide a read head with a case and flex circuitry or other such interconnection means, to supply power to the head, receive decoded signals from the head, or transmit digital signals to the head.

It is a still further object of the invention to provide a hybrid read head with IC components which has a higher reliability and lower cost than do magnetic read heads with external decode electronics.

SUMMARY OF THE INVENTION

The present invention features a magnetic read head having built-in electronic decode circuitry in the form of IC components. No low-level, analog signals, which are generally highly susceptible to electrical noise, leave the head structure. Power and ground are provided to the hybrid head. This invention combines the head element and, attached inside or directly on the immediate head structure, an IC together as a single structure, to form a single integrated reading component. This reading component is spring mounted as a single unit in the mechanical structure. Digitized data corresponding to encoded information upon a magnetic stripe on a credit card, I.D. badge, or similar article is provided at output terminals, attached cables, or other interconnections. In addition, a data strobe signal is provided by the head. An optional magnetic media detected signal may also be provided.

BRIEF DESCRIPTION OF THE DRAWINGS

A complete understanding of the present invention may be obtained by reference to the accompanying drawings, when taken in conjunction with the detailed description thereof and in which:

FIG. 4a is a schematic top view of an alternate embodiment of the read head with IC components wherein the IC components are mounted on a substrate attached to the back of a read head;

FIG. 4b is a schematic rear view the embodiment of the read head shown in FIG. 4a;

FIG. 5 is a schematic view of the read head and IC components shown in FIG. 4 and also showing an attached cable and connector.

The same or similar reference numerals are used throughout the drawings to depict like components.

DETAILED DESCRIPTION OF THE PREFERRED EMBODIMENT

Generally speaking, this invention relates to a magnetic read head for use in recovering encoded information from the magnetic stripe on a credit card or similar article. More specifically, there is disclosed a magnetic read head having IC components which provide a digital signal output. This invention combines the head element and, attached inside or directly on the immediate head structure, an IC together as a single structure, to form a single integrated reading component. This reading component is spring mounted as a single unit in the mechanical structure.

Figure 1:
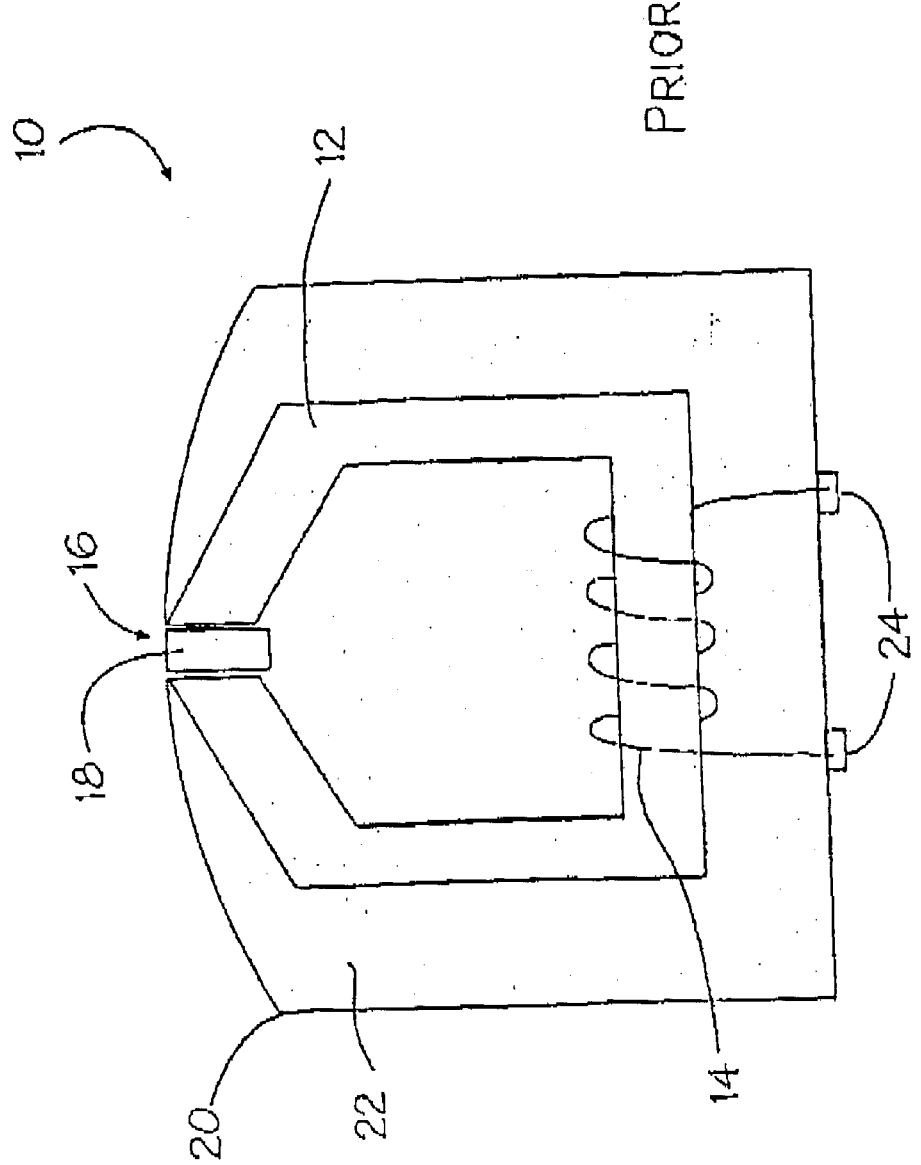
FIG. 1 is a cross-sectional, schematic drawing of a typical magnetic read head of the prior art.

Referring first to FIG. 1, there is shown generally at reference number 10, a cross-sectional view of a typical magnetic read head. A core 12 is constructed from a high-permeability material such as mumetal or ferrite. Ferrite cores 12 are generally solid pieces of material while those constructed from steel or mumetal are often laminated to reduce eddy currents in the core 12 structure. Core 12 is discontinuous at an apex region 16. A winding coil 14 is wrapped around core 12 such that magnetic flux (not shown) in core 12 induces a voltage in the winding 14 which terminates at external connectors 24. An optional shim 18 may be placed in the gap in core 12 at apex region 16. Core 12, winding 14 and optional shim 18 are all enclosed in a common housing 20. A potting material 22 may be used to fill the space in housing 20 not occupied by the head components, thereby securing the components. Housing 20 is generally constructed from a high permeability material which provides magnetic shielding to the coil 14 of head assembly 10.

Figure 2:
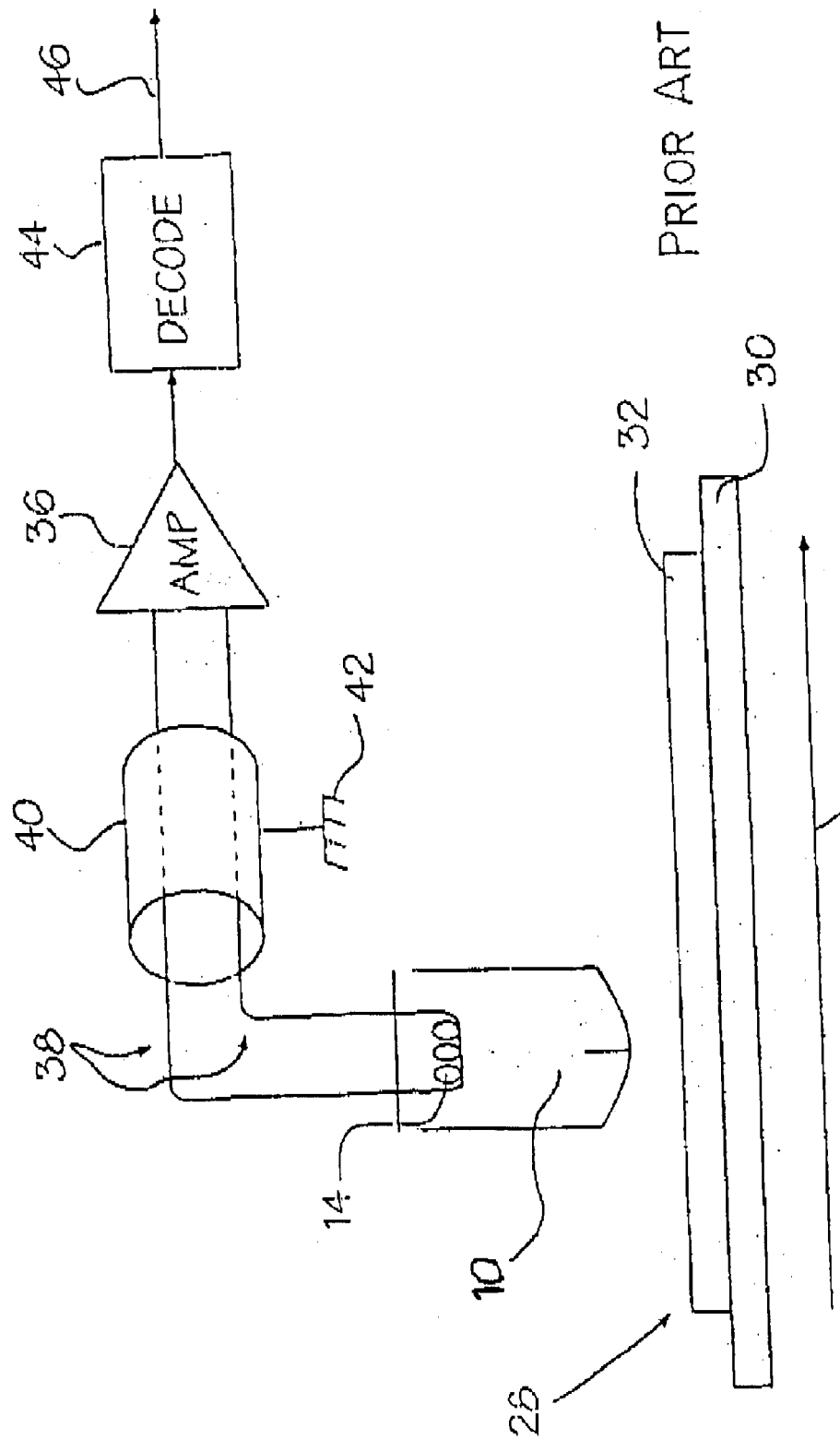
FIG. 2 is a schematic block diagram of a typical magnetic stripe reading system of the prior art.

Referring now to FIG. 2, there is shown a simplified, schematic block diagram of a typical magnetic read head 10 of the prior art shown "reading" information from a magnetically-encoded article 28. The article 28 comprises a plastic substrate 30 with a magnetic stripe 32 disposed thereupon. This is a construction typically used for credit cards, ID badges, hotel keys, and many other applications and structures well known to those skilled in the art.

When article 28 is moved past read head 10 as shown by arrow 34, magnetic information (not shown) previously encoded onto magnetic stripe 32 induces a small voltage into winding 14 of head 10. This voltage is coupled to an amplifier 36 along a wire or cable 38. Cable 38 generally has a shield 40 connected to ground 42. Shield 40 is designed to protect the small voltage generated by head 10 from interference by electromagnetic fields (not shown) in the region of cable 38.

Amplifier 36 is generally provided with a differential input to help minimize common-mode interference. Other strategies and/or amplifier configurations are well known to those skilled in the circuit design art. An output signal from amplifier 36 is provided to a decode circuit in the form of one or more IC components (hereinafter referred to as "an IC component") 44' where the amplified, analog signal from head 10 is converted to a digital signal at a standard voltage. Decode circuitry suitable for use in the application of magnetic stripe reading is well known in the art, as is exemplified, for example, in U.S. Pat. No. 5,240,523 for DECODING FOR MAGNETIC STRIPE RECORDING, issued to George R. Steele.

Figure 3:
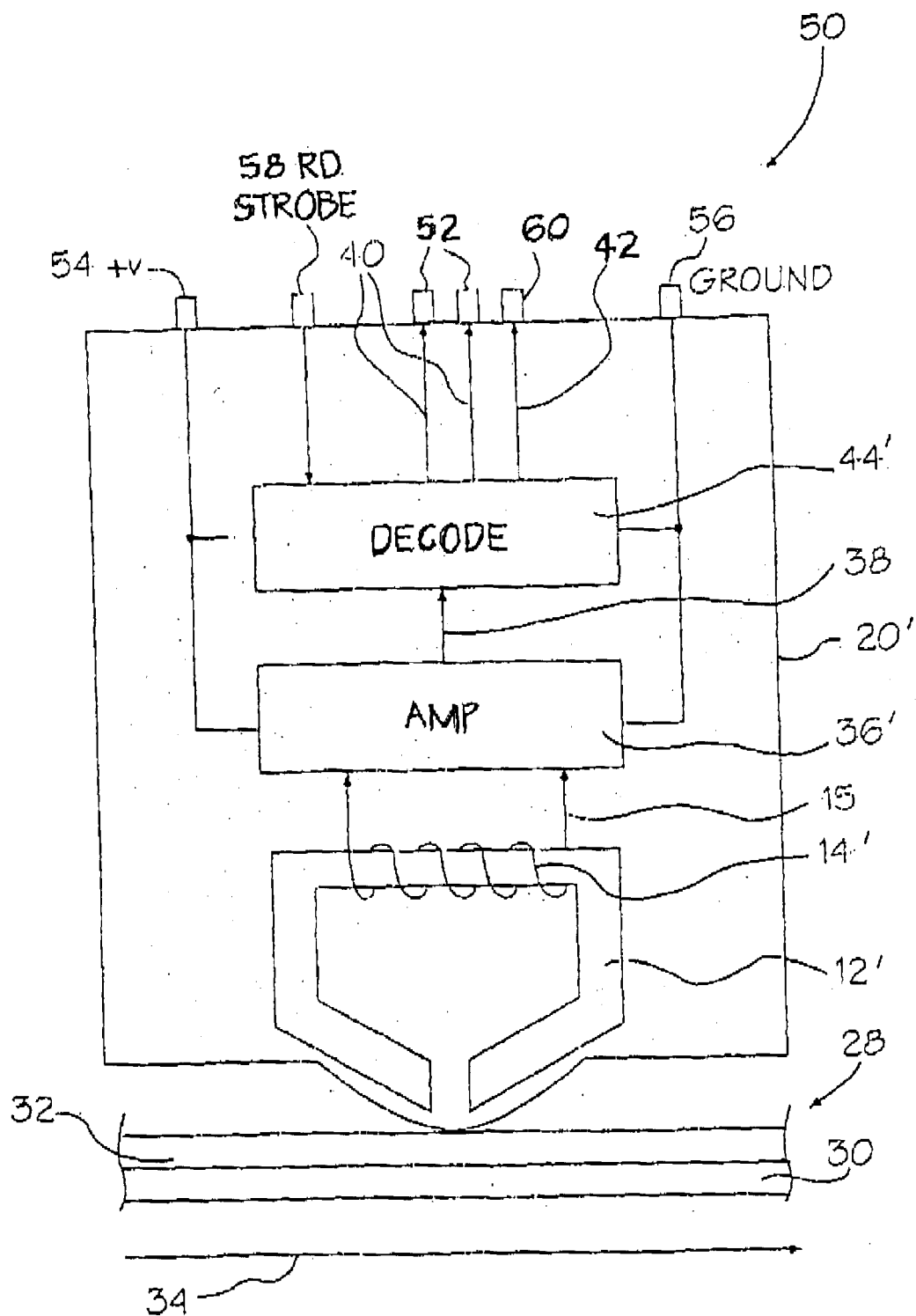
FIG. 3 is a schematic block diagram of the read head with IC components of the invention.

Referring now to FIG. 3, there is shown a simplified schematic block diagram of the magnetic read head 50 of the present invention shown "reading" information from a magnetically-encoded article 28. As in the prior art, when article 28 is moved past read head 50 as shown by arrow 34, magnetic information (not shown) previously encoded onto magnetic stripe 32 induces a small voltage into winding 141 wound on core 12' of read head 50. The low-voltage, analog output signal from core 14' no longer must leave the read head 10 (FIG. 2) and be subjected to electromagnetic fields, as in the prior art. The output signal 15 is directly coupled to the input of amplifier 36' proximate winding 14'. Because winding 14' and amplifier 36' are located close together, completely within shielding housing 20', the small, analog signals are no longer exposed to extraneous electromagnetic interference. Design parameters for amplifier 36' may possibly be less demanding than for amplifier 36 (FIG. 2) of the prior art.

An output signal 38 from amplifier 36' is provided to the input of IC component 44'. Since magnetic heads comprise one or two or three read elements, one IC component 44' is required for each read element. The amplified, analog signal 38 from winding 14' is converted to a digital output signal 40 at a standard voltage. IC component 44' may be implemented using application-specific integrated circuits (ASICs) or a general-purpose microprocessor in combination with programmable array logic devices, (PALs) or other gate array devices as are well known to those skilled in the art. Other ancillary passive components (not shown) such as decoupling capacitors or the like may also be provided. The output signal 40 is provided at output connections 52.

Voltage and ground signals are provided to hybrid head 50 at terminals 54 and 56, respectively. In addition, a read strobe signal is provided by IC component 44' via output connector 58. An optional magnetic medium detected output signal 46 generated by IC component 44' may be provided at connector 60 on head 50. The magnetic medium detected output signal 46 may be used by external equipment attached to the read head but is not a part of the instant invention.

The inclusion of amplifier 36' and IC component 44' at the head 20' provides several important advantages. First, the inclusion of the IC component 44' close to the coil 14' of the read head 10 itself essentially eliminates the exposure of the low-level, analog signal 15 from the head 10 to extraneous electro-magnetic fields. This allows for simplification particularly of the amplification circuitry. Because low level, external connections are eliminated, the overall reliability of the head/amplifier/decode system is improved. These read/amplify/decode functions can also be performed with a device costing substantially less than do the individual components of the prior art.

Referring now to FIGS. 4a and 4b, there are shown, generally at reference numeral 60, schematic top and rear views, respectively, of a read head assembly with IC components mounted on a substrate 62 attached to the back of a read head 10. Substrate 62 is configured to hold and interconnect a variety of electronic components, typically one or more ASICs 64, along with miscellaneous support circuitry (not shown). Substrate 62 may be attached to head 10 in a variety of ways well known to those skilled in the art. An optional protective coating 67 may be placed over the assembly of head 10 and substrate 62 when required. This coating may be a potting or other suitable material. Substrate 62 is shown mounted to the rear surface of head 10. It should be obvious that substrate 62 may be attached to other surfaces of head 10 when required by a particular operating environment.

Referring now to FIG. 5, there is shown a schematic view of the head/substrate assembly 60 with an attached cable 66. Cable 66 provides power to the circuitry on substrate 62 and also carries digital signals to and from the circuitry. One end of cable 66 may be permanently attached to substrate 62 or, in alternate embodiments, attached to substrate 62 by means of an optional connecter (not shown). The other end of cable 66 terminates in a connector 68 adapted to plug into a socket (not shown)

Figure 6:
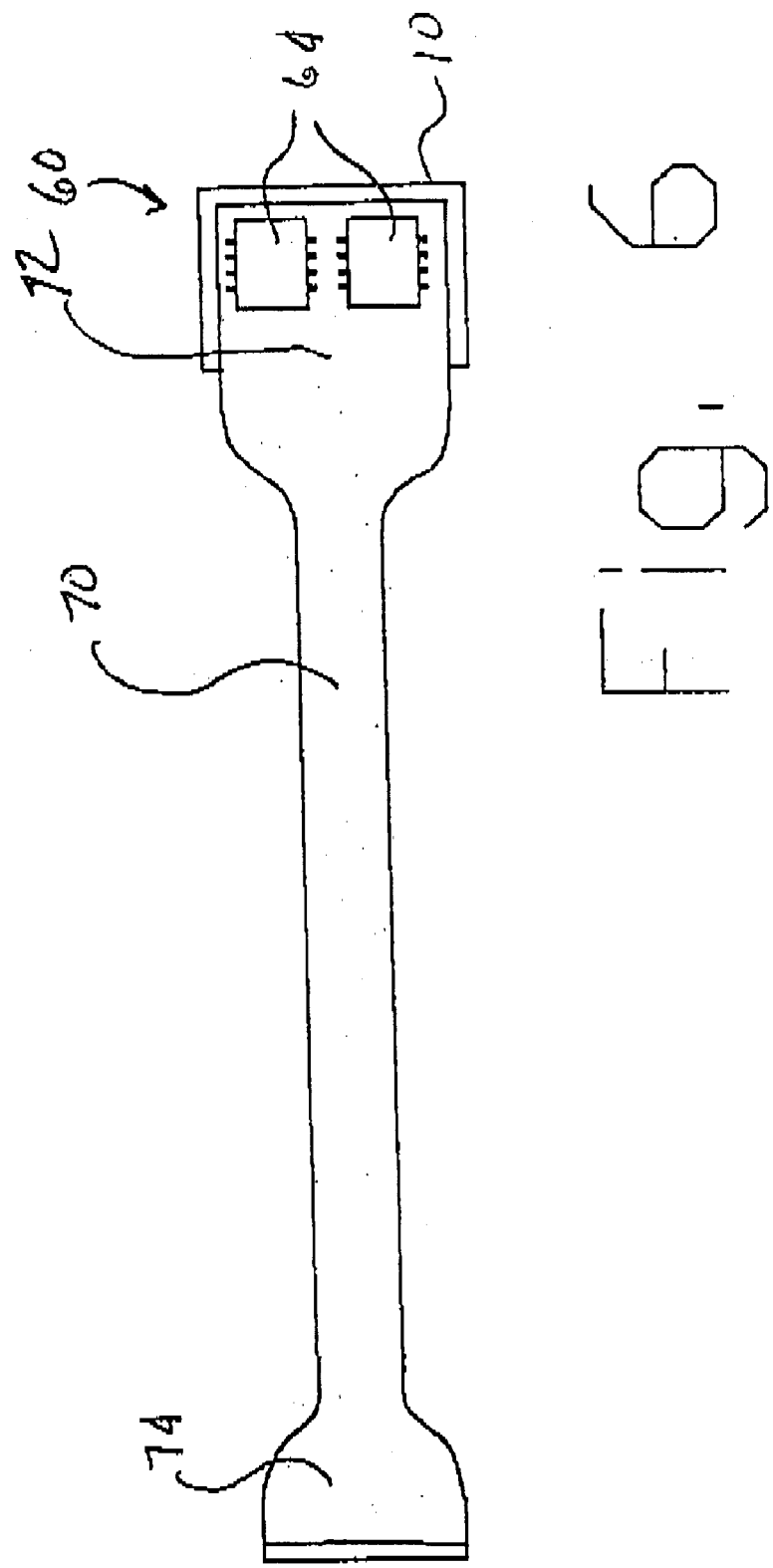
FIG. 6 is a schematic view of a third embodiment of the read head with IC components wherein the IC components are mounted on a substrate integrally attached to a flexible circuit assembly.

Referring now to FIG. 6, there is shown a schematic view of another alternate embodiment of the read head with IC components. The function of substrate 62 (FIG. 4) has been replaced by flexible circuit assembly 70. One end 72 of flexible circuit 70 has been widened to accommodate ASICs 64 and other ancillary circuitry (not shown) and is attached to head 10. Conductors in flexible circuit 70 replace the function of cable 66 (FIG. 5). The distal end 74 of flexible circuit 70 is formed into a connector adapted to mate with an external socket (not shown). The use of a flexible circuit assembly 70 improves the overall reliability at a lower component cost than that of the embodiment of FIGS. 4a, 4b and 5.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for reading, amplifying, and decoding a magnetic signal generated from a magnetically encoded article, said apparatus comprising:

a. a housing;

b. a substrate mounted within said housing;

c. a magnetic read head structure attached to said substrate and comprising a core having a gap and a winding coil for generating a coil output voltage in said winding coil in response to changes in magnetic flux in said core created by the motion of said magnetic read head structure relative to said magnetically encoded article;

d. an amplifier electrically connected to said magnetic head structure and mounted to said substrate, said amplifier adapted to receive and amplify said coil output voltage and generate an amplifier output voltage; and e. an IC component electrically connected to said amplifier and mounted to said substrate, said IC component adapted to receive said amplifier output voltage and convert it to a digital signal representative of information encoded in said magnetically encoded article.

2. The magnetic read head apparatus as recited in claim 1, wherein said IC component further comprises strobe signal output means for generating a strobe signal, and wherein said conversion of said amplifier output voltage into said digital signal is at least partially controlled by said strobe signal.

* * * * *